(12) United States Patent
Moran (10) Patent No.: US 8,378,830 B2
(45) Date of Patent: Feb. 19, 2013

(54) INTELLIGENT HYDRATION SYSTEMS AND METHODS

(76) Inventor: Dan Moran, Dallas, TX (US)

( * ) Notice: Subject to any disclaimer, the term of this patent is extended or adjusted under 35 U.S.C. 154(b) by 1293 days.

(21) Appl. No.: 11/376,613

(22) Filed: Mar. 15, 2006

(65) Prior Publication Data

US 2007/0222619 A1 Sep. 27, 2007

(51) Int. Cl.
*G08B 23/00* (2006.01)

(52) U.S. Cl. ............... 340/573.1; 340/870.01; 222/243; 73/861.79

(58) Field of Classification Search ............ 340/573.1, 340/870.01; 221/2–8; 73/861.79, 861.77; 222/243; 206/459.1
See application file for complete search history.

(56) References Cited

U.S. PATENT DOCUMENTS

| | | | |
|---|---|---|---|
| 3,612,090 A * | 10/1971 | Kassel | 137/209 |
| 4,830,226 A * | 5/1989 | Kong | 222/205 |
| D314,308 S | 2/1991 | Cogswell | |
| 5,129,352 A | 7/1992 | Roberts | |
| 5,260,914 A | 11/1993 | Roberts | |
| D351,313 S | 10/1994 | Giard, Jr. | |
| 5,896,990 A | 4/1999 | Barzana | |
| 6,212,959 B1 * | 4/2001 | Perkins | 73/861.77 |
| 6,252,494 B1 * | 6/2001 | Howell | 340/309.8 |
| 6,478,152 B1 | 11/2002 | Mansfield | |
| 6,523,688 B1 * | 2/2003 | Palmieri | 206/459.1 |
| 6,588,593 B2 * | 7/2003 | Woskoski | 206/459.1 |
| 2002/0129663 A1 * | 9/2002 | Hoyt et al. | 73/861.79 |
| 2005/0229699 A1 | 10/2005 | Chai et al. | |
| 2005/0229700 A1 | 10/2005 | Chai et al. | |
| 2006/0081653 A1 * | 4/2006 | Boland et al. | 222/243 |
| 2007/0024465 A1 * | 2/2007 | Howell et al. | 340/870.01 |

* cited by examiner

*Primary Examiner* — Hoi Lau (57) ABSTRACT

A hydration system comprising a dispenser portion adapted to allow a drinking fluid to flow therethrough, a sensor unit positioned to take a measurement of a flow of the drinking fluid through said dispenser portion and to output said measurement, a logic unit in communication with the sensor portion to receive said measurement output, to set a target consumption over time based on a multidimensional profile of a user's physical body information, and to determine if the user's consumption meets the target consumption based upon the measurement.

7 Claims, 6 Drawing Sheets

701 — RECEIVE INPUT TO A PROCESSING UNIT SPECIFYING BODY CHARACTERISTICS OF THE USER

702 — SET BY THE PROCESSING UNIT A TARGET FLUID CONSUMPTION FOR THE USER BASED UPON THE BODY CHARACTERISTICS

703 — MEASURE AN ACTUAL FLUID CONSUMPTION OF THE USER USING THE PROCESSING UNIT

704 — COMPARE THE ACTUAL FLUID CONSUMPTION TO THE TARGET FLUID CONSUMPTION

705 — ALERT THE USER TO INCREASE THE ACTUAL FLUID CONSUMPTION IF THE COMPARING INDICATES THAT THE ACTUAL FLUID CONSUMPTION IS LESS THAN THE TARGET FLUID CONSUMPTION

*FIG. 8*

INTELLIGENT HYDRATION SYSTEMS AND METHODS

TECHNICAL FIELD

The present invention relates in general to dispensing liquids, and more specifically, to facilitating a user's hydration.

BACKGROUND OF THE INVENTION

It is a widely held belief that most people do not drink enough water and, as a result, are not fully hydrated. Such a situation is unfortunate, as hydration affects a person's daily health and mental alertness. An example of the importance of hydration is shown by the lengths to which health care facilities go to monitor the water intake of patients. Most people drink as they remember to drink; however, most people do not remember to drink until they are thirsty, and the sensation of thirst usually appears after a person is already suffering from some level of dehydration. There are products in the market today that encourage consumption of water, such as simple water bottles that a user can buy at a store and carry throughout work, play, and relaxation at home. There is no device available today, however, that sets a target consumption for a user, much less a system that sets a personalized target consumption based on a variety of personal characteristics.

BRIEF SUMMARY OF THE INVENTION

The present invention is directed to intelligent hydration systems and methods which alert a user to drink more water and/or other fluid. In an example embodiment, a user inputs his or her age, height, weight, sex, activity level, body type, lifestyle habits, and/or other relevant factors. The factors that describe the physical characteristics of the person's body (e.g., age, height, weight, sex, body type, and/or the like), when taken in various combinations, form one or more multi-dimensional physical profiles that the system and method may use to generate a target fluid consumption for the user. The system and method of one embodiment compare the target consumption to the user's actual consumption and remind the user to drink, as appropriate. Such comparing and reminding can be performed periodically or continually for as long as the user desires—even indefinitely.

Another example embodiment of the invention includes a dispenser unit, sensor unit, and logic unit. The dispenser unit directs a flow of liquid, and may be, for example, a spout or nozzle. The sensor unit detects the flow of liquid and sends a signal to the logic unit indicating the flow. In addition to generating and setting the target consumption for the user, the logic unit also compares the cumulative flow of liquid to the target consumption. The logic unit employs transducers, such as a speaker, buzzer, LED, display screen, and/or the like to alert the user when actual consumption should be increased.

In yet another example, the dispenser unit, sensor unit, and logic unit are included in a beverage container cap or lid assembly that can be detachably coupled to one or more beverage containers in the marketplace. Such an embodiment may include one or more adaptors that allow the cap or lid assembly to be coupled to many differently shaped beverage containers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
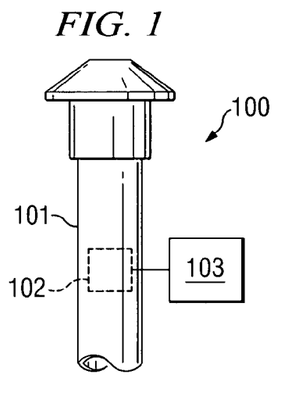
FIG. 1 is an illustration of an exemplary system according to at least one embodiment.

FIG. 1 is an illustration of exemplary system 100 according to at least one embodiment. System 100 includes dispenser unit 101, sensor unit 102, and logic unit 103. Generally, dispenser unit 101 allows fluid to flow therethrough, and the flow is measured by sensor unit 102. Logic unit 103 compares the measured flow to a target consumption volume or rate to determine if a user is drinking enough of the fluid. In this example, logic unit 103 is operable to set the target consumption level based on a multidimensional body profile of the user.

Figure 2A:
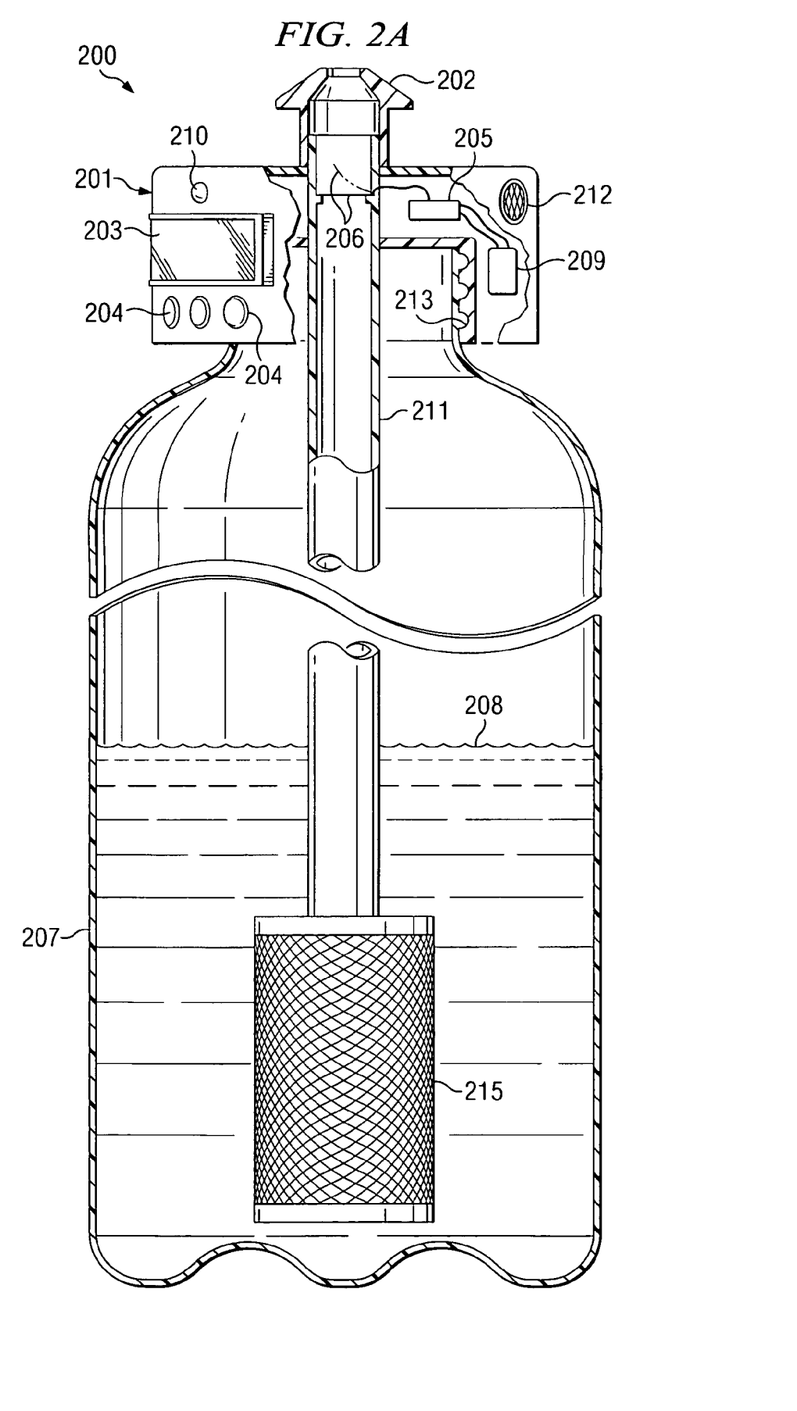
FIG. 2A is an illustration of an exemplary system according to at least one embodiment of the invention.

FIG. 2A is an illustration of exemplary system 200 according to at least one embodiment of the invention. FIG. 2A provides a more detailed view of a system based, at least in part, on system 100 (FIG. 1). System 200 includes cap assembly 201 with spout 202 for dispensing fluid. System 200 also includes display 203 with an output mechanism to provide a visual indication of present consumption, target consumption, settings, and the like. Display 203 may be a Liquid Crystal Display (LCD), a Light Emitting Diode (LED) display, or the like. Line 208 indicates an example level of drinking fluid. Various embodiments are not limited by type of drinking fluid and can accommodate any potable liquid including, but not limited to, water, carbonated beverages, sports drinks, fruit juices, herbal and/or medicinal drinks, and the like.

Cap assembly 201 provides user input devices—in this example, buttons 204. Other embodiments may also include one or more of a touch screen, a cursor pointing device, or the like, and may even include an interface, such as a Universal Serial Bus (USB) interface to allow programming from a computer or Personal Digital Assistant (PDA). A user may input information, including personal body characteristics and device settings, via buttons 204. Such input can be indicated on display 203. In fact, some embodiments may also include one or more sensor inputs to detect body moisture levels or body conductivity, on portions of assembly 201 that contact the skin of the user. LED 210 provides a visual alarm when calculations indicate that the user should drink more fluid. Similarly, speaker 212 provides an audible alarm for the user.

The inputs and outputs, including display 203, LED 210, speaker 212, and keys 204 are in communication with processing circuit 205, which may be a collection of logic circuits, such as a microprocessor. Processing circuit 205 is also in communication with sensor unit 206. Processing and input/output can be powered by a variety of techniques, including, for example, battery 209, a solar panel (not shown), a power converter and cable (not shown), and the like.

Cap assembly 201 is adapted to be used with a variety of containers on the market, including, for example, water bottles, such as those provided by OZARKA™, sports drink containers, such as those provided by GATORADE™, bicycle and sport water bottles, and the like. In fact, FIG. 2A shows cap assembly 201 adapted to fit bottle 207, which conforms to the most common shape of sport water bottles, such that cap assembly 201 may be interchanged among a number of sport water bottles with the same cap fitting. An additional feature in some embodiments includes one or more adaptors (not shown) that couple to threads 213 of cap assembly 201 and fittings on one or more bottles. Such adaptors are described in more detail with regard to FIG. 6.

In one example, during a first use, a user enters personal body characteristics by interacting with keys 204 and saving a personal profile to circuit 205. As the user enters his or her personal information, display 203 preferably prompts the user for specific information by scrolling through the various fields. For example, with regard to a user's sex, display 203 gives an option of male or female, and for age, display 203 prompts the user to increment numbers until the appropriate age is reached. The user may continue to enter physical body characteristics, such as sex, weight, height, body type, infirmity, and the like, to constitute a multidimensional body profile of the user. Some body characteristics, such as perspiration amount or skin temperature, may be detected by cap assembly 201 using one or more sensor inputs (e.g., sensors to detect body moisture levels or body conductivity). The personal profile can be retained by processing circuit 205 for as long as the device is not reset. In fact, flash memory can be used to store personal profiles so that changing power supplies does not cause loss of data.

Continuing with the example, when the individual fills the container with liquid, system 200 senses that the user desires to begin, by, e.g., detecting that cap assembly 201 is newly screwed on to bottle 207, and turns itself on and loads the individual characteristics of the last known user, retrieve the multidimensional body profile thereof, and use the profile to determine a target consumption. Multiple user profiles may be stored with the option of overriding a last used or default user profile. The target consumption may be, for example, a certain volume measured at different time intervals, e.g., five minute intervals, fifteen minute intervals, hour intervals, or other similar intervals. (As explained further below, system 200 may change the target consumption and/or the intervals dynamically.) It should be noted that volume per unit time is a rate of consumption, and "consumption" as used herein may refer to an amount of fluid (e.g., volume, weight) or a rate of consumption. The target consumption may even take into account cumulative amounts over more than one interval, such that a rate over a span of time can be measured and/or maintained. Generally, if the user is consuming at least at the target rate, then the system 200 may remain silent or display a brief audio and or visual signal as it continues to monitor the liquid leaving the container. On the other hand, if the individual consumes at less than the target rate, system 200 activates either or both an audible (e.g., via speaker 212) and visual reminder (e.g., via display 203 and/or LED 210) that indicates to the user that he or she should drink from the container. A visual alert may also display how much liquid the user should consume and/or the user's consumption deficit.

Circuit 205, in this example, includes a database with recommended consumption rates and/or amounts, as suggested by leading nutritionists. Alternatively or additionally, the database may also be included in a host system computer that can interface with circuit 205. Circuit 205 uses the personal body characteristics to look up the recommended consumptions. For example if the user's profile indicates that the user is a 20 year old female, circuit 205 searches the database for information corresponding to a 20 year old female, using also height, weight, body type, and any other factors. The exemplary database is indexed based on the various characteristics so that the user's profile points to a recommended consumption. Circuit 205 retrieves the recommended consumption and sets it as the target rate. As explained above, circuit 205 uses the target rate to compare to the user's actual consumption rate and to alert the user that her consumption rate should be increased. Additionally or alternatively, circuit 205 may employ one or more mathematical formulae to calculate the target consumption by substituting values representing the various body characteristics for variables in such formulae. Setting said target consumption rate includes, in some examples, using a processor (e.g., circuit 205) to enter said target consumption value into a portion of memory accessed by the algorithm that compares the target consumption to the actual consumption.

In one example embodiment, circuit 205 may assume a level of hydration at the time he or she starts using system 200 or provide a means for input of the user hydration level. After generating the target consumption, circuit 205 waits for an amount of time and then compares the flow measurement to the target volume at that time. As explained above, system 200 may alert the user if the consumption is behind the target consumption. Circuit 205 measures via sensor 206 the amount of liquid that is leaving the container. After another amount of time, circuit 205 compares the user's actual consumption amount to target consumption amount for the elapsed time and may alert the user once more if the user's consumption is still behind the recommended amount. Time intervals between caparisons may become shorter if the user continues to fall behind the recommended amount.

For instance, if the target consumption is set at eight fluid ounces per hour, circuit 205 may compare the user's actual consumption to the target consumption at intervals of fifteen minutes. Since fifteen minutes is one quarter of an hour, circuit 205 compares the actual consumption amount to the target consumption amount for the elapsed time—two ounces. If the user has not consumed two ounces at that time, circuit 205 alerts the user to the deficit. Further, if the user ignores the alerts, the time interval may change from fifteen minutes to five minutes and the consumption target recalculated. On the other hand, if the user has consumed two or more ounces at the fifteen minute mark, then circuit 205 provides no alarm. Similarly, at the thirty minute mark, circuit 205 compares the actual consumption to four ounces and alerts the user if necessary. In some embodiments it is possible for a user to configure fixed or variable time intervals for reminders, in case, for example, the user prefers to drink all eight ounces at once at the end of the hour.

System 200 continues to compare actual consumption to target consumption for as long as the user desires, and in fact, may continue indefinitely if the user allows, as some embodiments do not require that the measurement be stopped at the end of a specific volume of fluid, an event, or a particular time interval. Further, system 200 may continue to measure uninterrupted should the user refill bottle 207.

In another example, the user leaves system 200 unattended for an amount of time, such that many time intervals have passed and system 200 has provided many alerts. In this example, system 200 may turn itself off to save power since the numerous alerts indicate that the user is not currently using the device. Power may also be saved by employing an integrated motion detector that can tell when a user has not manipulated the unit for an extended period of time. Alternatively, system 200 may continue to calculate the user's consumption deficit and issue appropriate alerts and displays despite prolonged nonuse.

In addition to setting a target consumption, various embodiments may also set target time intervals based upon the multidimensional body profile and/or activity levels. For example, based on the user's personal body characteristics, circuit 205 may retrieve or calculate a recommended consumption interval, such as, for example, five minutes, fifteen minutes, 30 minutes, or the like, at which to alert the user should the user's actual consumption fall behind the target consumption.

Moreover, some embodiments of system 200 are operable to change the target consumption dynamically (i.e., "on the fly") based on one or more criteria. For instance, one example embodiment provides for changing target consumptions based on the time of day or other environmental conditions. Thus, in the afternoon hours system 200 may suggest (based on nutritionists' guidelines) that the target consumption level increase, whereas in the morning hours the target consumption level may be lower than the afternoon hours. System 200 may increase the target consumption in the hours preceding bedtime to ensure that the user is fully hydrated before he or she retires for the day. Further, system 200 may increase target consumption during hot weather and decrease it during cold weather. In such embodiments, system 200 may include an integrated clock and/or thermometer or other environmental meter to track time of day and/or environmental conditions.

In an additional example, system 200 changes the target consumption based on user input indicating a change in activity level. For instance, if a user at the end of the workday proceeds to the gym, he or she may use key 204 to input another activity level or a change in activity level, e.g., from normal to moderate. Then, if the user goes to aerobics class, he or she can change the activity level from moderate to intense. In fact, any number of discrete activity levels may be accommodated by system 200, and in some embodiments, system 200 may accept input indicating specific activities (e.g., jogging, aerobics). Such changes may be provided for in a database and/or with mathematical formulae, as described above. In embodiments that determine target time intervals, such intervals may also be changed dynamically based on time of day, environmental conditions, activity, and/or activity level.

In fact, in some embodiments, system 200 may be able to take into account any relevant factors when setting a consumption or interval initially or dynamically. Thus, factors other than personal body characteristics may be included in one or more additional profiles. Examples of other factors include lifestyle characteristics (e.g., drinking caffeine products or alcohol, high fiber diet, use of protein supplements, living in warmer conditions, living at high altitude, etc.), activity type, activity level, environmental conditions, and the like, and such factors may be included in one or more additional profiles that are used, at least in part, to set the consumption and/or interval along with a multidimensional profile of personal body characteristics. As used herein, the terms, "personal body characteristics," and "physical body information," refer specifically to traits of a person's body.

System 200 may also include filter 215. Such a feature may encourage more picky users to drink more water, since such users may perceive no disadvantage to commonly available tap water.

Figure 2B:
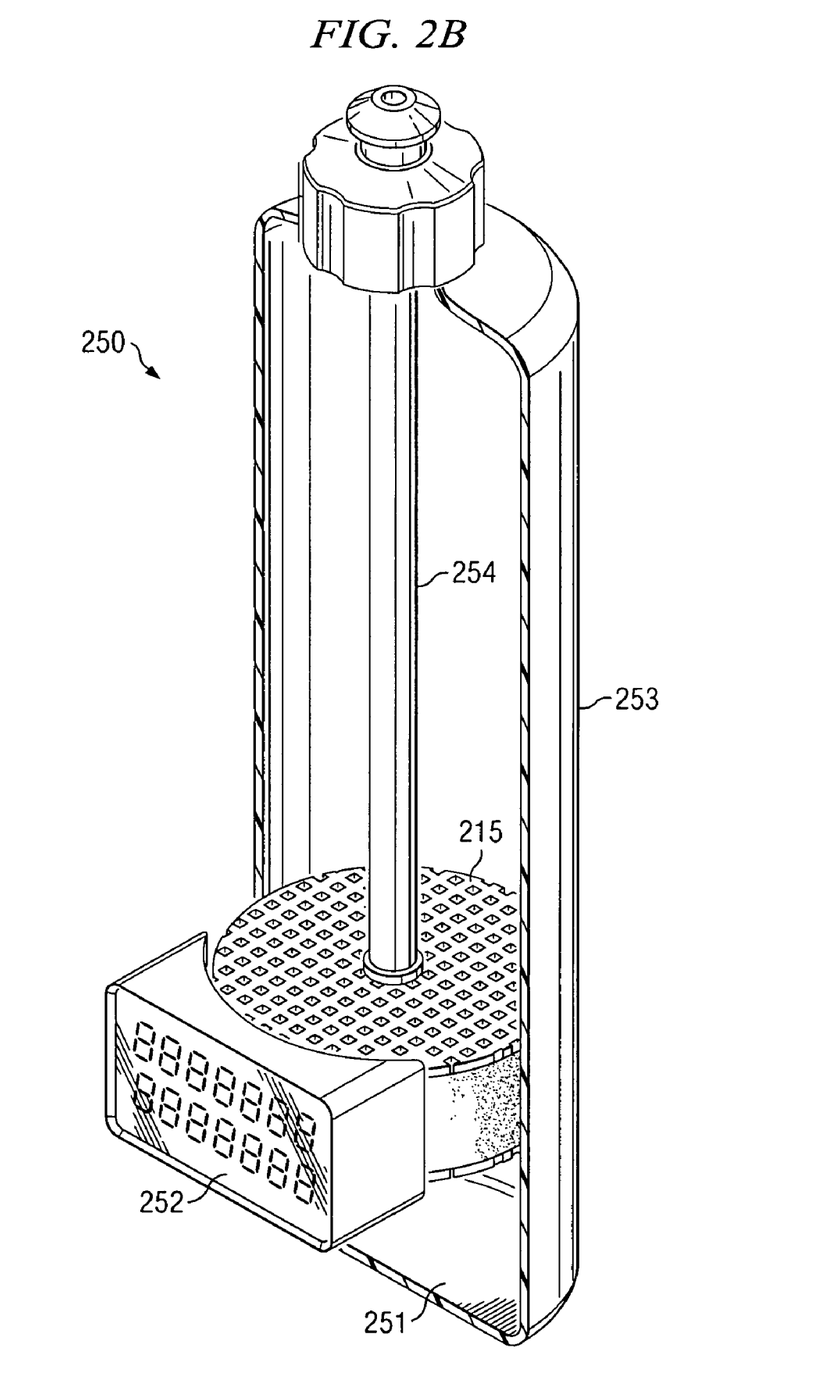
FIG. 2B is a cut-away view of an exemplary system according to at least one embodiment of the invention.

FIG. 2B is a cut-away view of exemplary system 250 according to at least one embodiment of the invention. System 250 is similar to system 200 in that it is compact and portable; however, it is different in that the functional portions are not integrated into a cap assembly. Rather, system 250 includes item 252 that is mounted on the side of beverage container 253. Item 252 includes, among other things, a dispensing portion inside straw 254, a sensor unit, and a processor unit (although such components are not shown explicitly). Fluid flows down through filter 215 into reservoir 251 where it is taken up by straw 254. Sensing fluid flow, comparing actual flow to target consumption, and alerting the user are performed in a manner similar to that described above with regard to FIG. 2A.

Figures 3, 4:
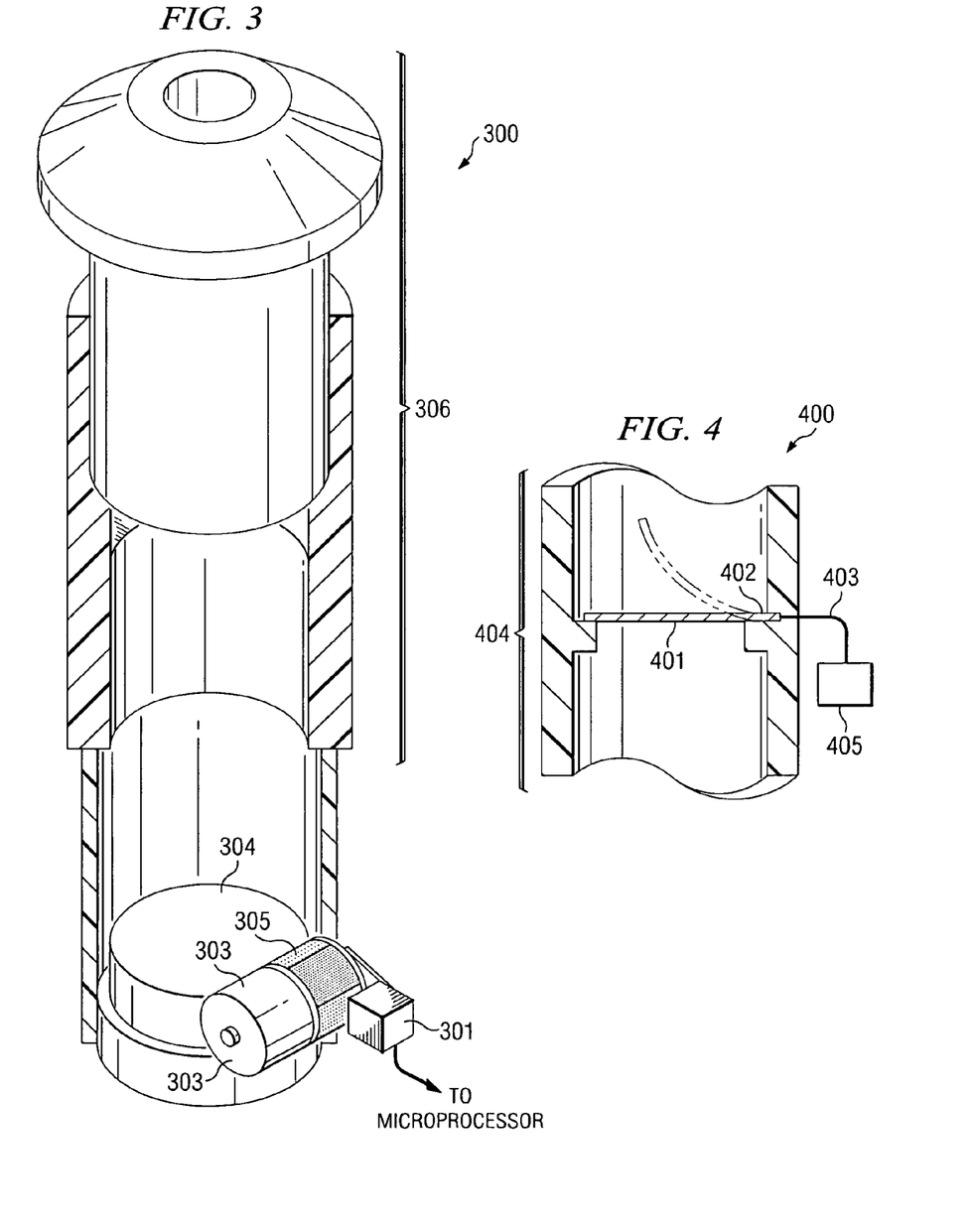
FIG. 3 is an illustration of an exemplary system for measuring consumption and fluid flow according to at least one embodiment of the invention.
FIG. 4 is an illustration of an exemplary system for measuring consumption and fluid flow according to at least one embodiment of the invention.

Two example embodiments for measuring fluid flow and consumption are shown in FIGS. 3 and 4. However, it should be noted that various embodiments of the invention are not limited to any particular way of measuring consumption and fluid flow, and may include one or more of an impeller, a paddle wheel, Doppler sonography unit, pressure measurement unit, and the like.

FIG. 3 is an illustration of exemplary system 300 for measuring consumption and fluid flow according to at least one embodiment of the invention. FIG. 3 shows an optical sensor assembly that includes trap door 304 and fixed hinge 303 on trap door 304 that is attached to color wheel 305. The opening of trap door 304 causes color wheel 305 to rotate. The outside surface of color wheel 305 includes at least two colors, and as color wheel 305 rotates, optical sensor 301 detects the color change.

For example, as a user takes a drink, fluid flows through dispensing portion 306, and it pushes trap door 304 open, thereby rotating color wheel 305 such that sensor 301 sees a color change from red to orange to yellow. Sensor 301 sends a signal indicating the color change to a microprocessor (e.g., circuit 205 of FIG. 2) that calculates a flow rate and volume therefrom to generate the user's actual consumption. As the user stops drinking trap door 304 returns to the closed position, thereby rotating color wheel 305 so that the red portion is sensed by sensor 301. Sensor 301 sends a signal to the microprocessor, which calculates that trap door 304 is shut and fluid flow is zero.

FIG. 4 is an illustration of exemplary system 400 for measuring consumption and fluid flow according to at least one embodiment of the invention. In this example, flexible resistor 401 is placed in the flow path of dispensing portion 404. Flexible resistor 401 is connected to microprocessor 405 through line 403. As a user takes a drink, the fluid deforms flexible resistor from an approximately planar shape (shown in solid line in this figure) to a more curved shape that is bent from hinge 402 (shown in dashed line in this figure). As flexible resistor 401 is bent, its resistance changes, thereby changing an amount of current flowing to microprocessor 405. The change in current indicates, therefore, a change in the amount of obstruction of the flow path attributable to flexible resistor 401, and microprocessor 405 uses such change to calculate a flow rate and volume. As flexible resistor 401 closes, the current again changes, thereby indicating to the microprocessor that flexible resistor 401 is closed and flow is zero.

Figure 5:
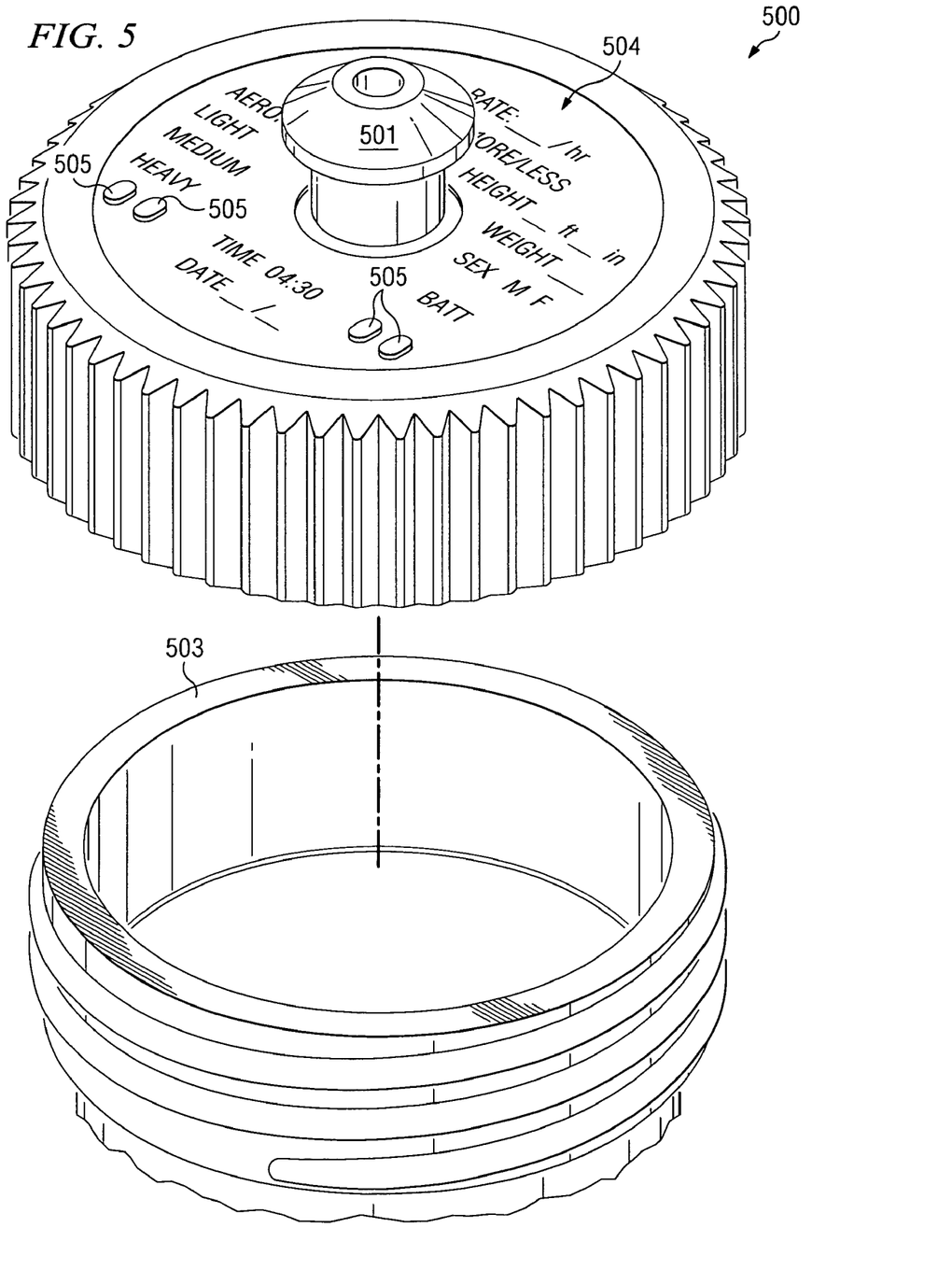
FIG. 5 is an illustration of an exemplary cap assembly according to at least one embodiment of the invention.

As mentioned above, various embodiments of the invention include integrating the functional units into a beverage container cap assembly that can be attached to a container, detached, moved from container to container, and the like. FIG. 5 is an illustration of exemplary cap assembly 500 according to at least one embodiment of the invention. Cap assembly 500 can be designed to contain a sensor unit (not shown), a microprocessor (not shown), and a battery (not shown), among other things. Such electronic components may be housed in waterproof portions of assembly 500. Additionally, as shown in FIG. 5, cap assembly 500 includes nozzle 501 display 504, and buttons 505. Surface 502 of cap assembly 500 includes axial ridges for gripping when attaching and/or detaching cap assembly 500 to a beverage container. Underneath cap assembly 500, and not shown in this view, are fastening structures, such as threads or clips to facilitate attaching and/or detaching of cap assembly 500 to a beverage container. In one example, threads are included that are designed to fit standard twelve-ounce water bottles that consumers typically buy for individual consumption. In another example, cap assembly 500 includes a friction fastening mechanism, as is included on many bicycle water bottles. In fact, any kind of fastening structure may be included in cap assembly to 500 provide a means of attaching and/or detaching cap assembly to a fluid container.

Cap assembly 500, in this example, includes one or more adaptors, such as adaptor 503, that is operable to couple to cap assembly 500 and also to another adaptor or a beverage container. As shown, adaptor 503 includes threads designed to interact with threads on the underside of cap assembly 500, thereby coupling adaptor 503 to cap assembly 500. Additionally, adaptor 503 includes a lower section (not shown in its entirety) of a smaller diameter than the upper section. In other words, adaptor 503 may operate to couple cap assembly 503 to a beverage container with a fitting smaller than that which can be accommodated by cap assembly 500 directly. Cap assembly 500 may include one or more interchangeable adaptors to enable a user to employ cap assembly 500 with a variety of water bottles in the marketplace. Such a feature may operate to enhance the portable qualities of cap assembly 500 so that it can be used with many different bottle types and increase a user's choices.

Figure 6:
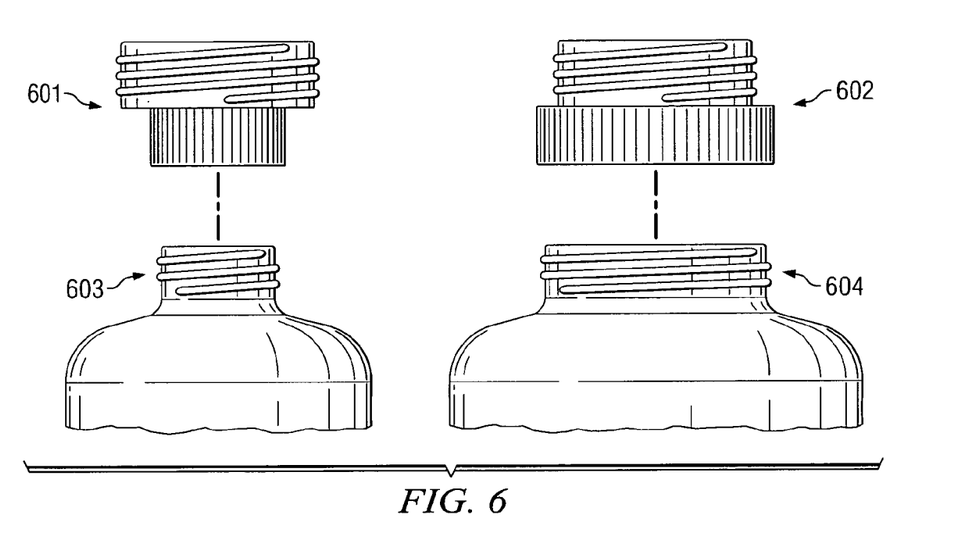
FIG. 6 is an illustration of a plurality of adaptors according to at least one embodiment of the invention.

FIG. 6 is an illustration of a plurality of adaptors according to at least one embodiment of the invention. Adaptor 601 is similar to adaptor 503 (FIG. 5), as it is operable to couple a cap assembly to container fitting 603 that is smaller in diameter than the cap assembly itself. Adaptor 602 is operable to couple a cap assembly to container fitting 604 that is larger in diameter than the cap fitting itself. While the examples given focus on threaded fittings, adaptors may be used to couple other kinds of fittings, such as those that use clips to couple, use friction, such as for spill-proof cups, and the like.

Figure 7:
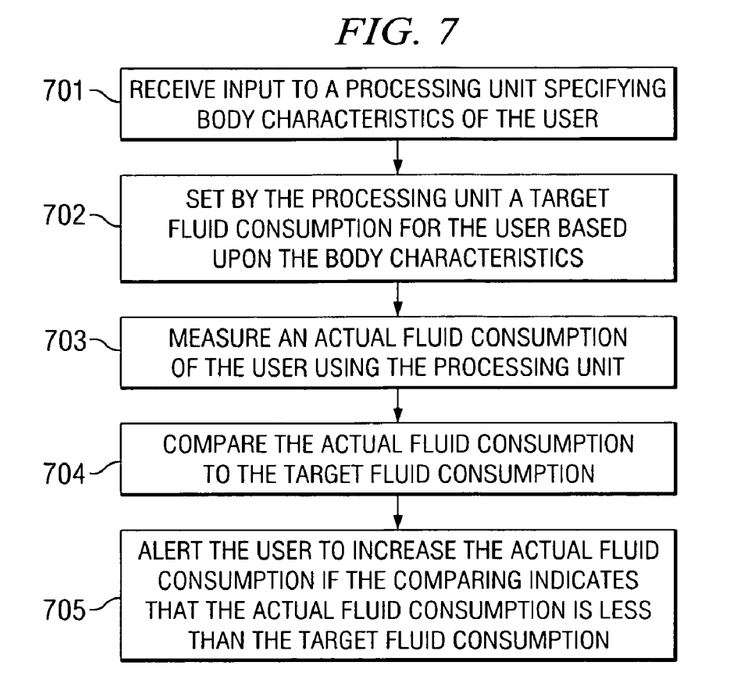
FIG. 7 is an illustration of an exemplary method according to at least one embodiment for facilitating a user's hydration.

FIG. 7 is an illustration of method 700 according to at least one embodiment for facilitating a user's hydration. Method 700 may be performed by an advanced hydration system, such as system 200 of FIG. 2. In step 701, the hydration system receives input to a processing unit specifying multiple different body characteristics of the user. The characteristics provide a multidimensional body profile of the person. The input may be through a keypad, touchscreen, cursor pointing device, or the like. The processing unit may be, for example, a general purpose microprocessor, an Application Specific Integrated Circuit (ASIC), a customized arrangement of logic gates, a low cost processor, such as is found in digital watches and toys, or similar logic circuits that are programmable to perform the method described herein. In fact, some or all of the steps of method 700 may be performed by the processor as it executes instructions saved to itself or to a peripheral memory included in the advanced hydration system.

In step 702, the processing unit sets a target fluid consumption for the user based upon the multidimensional body profile of body characteristics. Setting the target fluid consumption may include generating the target fluid consumption by accessing it from a database, calculating it from a formula, or a combination of the two. In an example embodiment, the target consumption is a value over some amount of time, e.g., a half-gallon in a day, measured at time intervals that can be based, at least in part, on a multidimensional body profile, activity, activity level, environmental conditions, time of day, and/or other relevant factors. Further, in some examples, the processing unit enters the value for the target fluid consumption in a portion of memory accessed by the comparing algorithm described below. Moreover, such setting may include changing the target fluid consumption based on activity, activity level, environmental conditions, time of day, and/or other relevant factors, and such changing may even be performed dynamically.

In step 703, the processing unit measures an actual fluid consumption of the user. As explained above, many techniques exist to detect fluid flow, thereby measuring fluid consumption. For example, a color wheel and optical sensor device may be used, as may a flexible resistor, as shown in FIGS. 3 and 4, respectively, to send signals to the processor unit indicating fluid flow. Other devices now known or later developed may be used in addition to or instead of the sensors described above.

In step 704, the processing unit compares the actual fluid consumption to the target fluid consumption. In step 705, the processing unit alerts the user to increase the actual fluid consumption if the comparing indicates that the actual fluid consumption is less than the target fluid consumption. The alert may be an audible alert, a visual alert, even a tactile alert, such as vibrating, or a combination thereof.

The measuring, comparing, and alerting may be performed continually and/or periodically, even indefinitely, for as long as the user desires, such that the user continues proper hydration throughout a day or a period longer than a day by continuing use of the system. Thus, rather than requiring a user to enter a time and a target consumption during the time, various embodiments provide the user with one or more target rates that are appropriate for everyday living, special activities, and long-term goals.

Various embodiments of the invention are not limited to being integrated into beverage container cap assemblies. For instance, some embodiments may be included in a spout assembly for a personal water cooler or other less portable container that a user keeps at his or her desk or home. Thus, not all embodiments are as portable as the one depicted in FIG. 2.

Various embodiments are not limited to being used for hydration liquids. For instance, some runners eat a paste of protein referred to as "goo." An embodiment of the present invention can be adapted to ensure proper protein consumption by setting a target consumption appropriate for a particular person for such goo while comparing the target consumption to actual protein consumption in a manner similar to that described above for fluids.

Various embodiments may be equipped to provide target consumptions for a variety of different liquids. For instance, sports drinks may hydrate with a different effectiveness than water. Accordingly, the system may allow user input to indicate the sports drink from a list of possible liquids, and the database, and/or mathematical formulae are adapted to provide a target consumption unique for the individual for the sports drink.

Various embodiments may also warn a user against too much consumption. For instance, in addition to or alternatively to setting a target consumption, a system may set a maximum consumption based on the various criteria, e.g., physical body characteristics, time of day, activity, environmental conditions, and the like. By comparing actual consumption to the maximum consumption, the system may alert a user when he or she gets close to or exceeds the maximum consumption. Such embodiments may be used with a variety of liquids, including alcoholic beverages.

Advantages may be realized by users of one or more embodiments. An advantage of some embodiments that are integrated into beverage container cap assemblies is that they are self-contained, small, and portable, even when coupled to a beverage container. Another advantage of some embodiments is that the target consumption can be tailored to meet individual users' hydration requirements based on their body characteristics, lifestyle habits, and/or activity levels.

Further, the fact that some embodiments set the target rate directly based upon the user's body characteristics, activity, environmental conditions, and/or time of day, help to ensure a proper target consumption since it bypasses the user's judgment and bias. For instance, if setting target rates is left up to users, some more reluctant users may be tempted to "cheat" by entering lower numbers, even if those users are aware of more appropriate target consumptions. Such systems are seen in the prior art, such as that disclosed in U.S. Pat. No. 6,212,959 to Perkins (hereinafter, Perkins), which merely receives user input specifying a desired consumption rate. Perkins mentions that its system is operable to receive user input indicating user weight and duration of exercise and to calculate a recommended consumption for display to a user based thereon. However, Perkins leaves the setting of the desired amount to the user's discretion, thereby facilitating deviation from the recommended amount. Further, Perkins can recommend an amount for consumption based on weight and exercise duration only, but cannot calculate a target consumption based on a multidimensional profile of a user's body characteristics, activity level, specific activity, time of day, environmental conditions, and/or the like. Moreover, Perkins cannot calculate a dynamic target consumption, nor a fixed or dynamic time interval.

Another advantage of some embodiments is that they can be small, mostly made of plastics and including an inexpensive processing unit, such that the retail price can be set below $20, including adaptors. Thus, various embodiments are inexpensive, portable, easy to use, and accurate.

Figure 8:
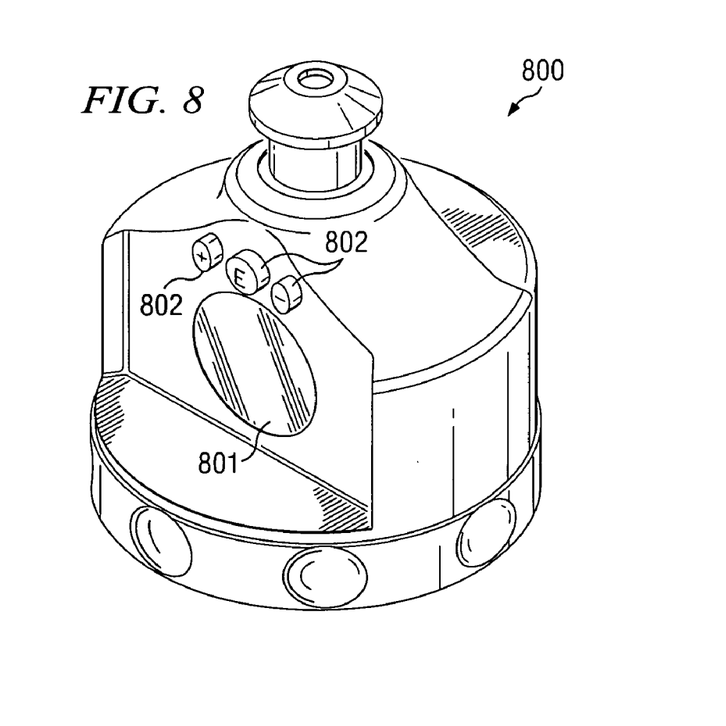
FIG. 8 is an illustration of an exemplary cap assembly according to at least one embodiment of the invention.

FIG. 8 is an illustration of exemplary cap assembly 800 according to at least one embodiment of the invention. Cap assembly 800 includes, among other things, display screen 801 and buttons 802. Cap assembly 800 is similar to system 200 or system 250, and is designed with marketing concerns in mind, including, for example, aesthetic concerns and ergonomic concerns. Cap assembly 800 may include many of the features and advantages discussed above.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An advanced hydration system comprising:
   a flow unit for dispensing fluid;
   a sensor unit for generating a measurement of said dispensed fluid;
   a processor unit for comparing said measurement to a target consumption value of said fluid, wherein said flow unit, said sensor unit, and said processor unit are included in a liquid container cap assembly; and
   a plurality of adaptors, each operable to couple to said liquid container cap assembly and to one or more beverage containers, thereby adapting said liquid container cap assembly to be interchangeable with a plurality of differently shaped beverage containers.

2. The system of claim 1 wherein said processor unit receives user input indicating personal body characteristics and to set said target consumption value based on a multidimensional profile of said personal body characteristics.

3. The system of claim 2 wherein said processor unit generates said target consumption value at least in part by accessing a database of target consumption values indexed according to said personal body characteristics.

4. The system of claim 2 wherein said multidimensional profile includes two or more of the following personal body characteristics:
   age;
   sex;
   height; and
   body type.

5. The system of claim 2 wherein processor unit sets a time interval based upon said multidimensional profile, said time interval for notifying said user to increase an actual consumption of said fluid.

6. The system of claim 2 wherein said processor unit changes said target consumption value dynamically based on user input indicating a change in activity level.

7. The system of claim 2 wherein said processor unit changes said target consumption value dynamically based on a time of day.

* * * * *